July 26, 1949.   W. F. MURRAY   2,477,198
GRATER OR SHREDDER
Filed Dec. 15, 1947   2 Sheets-Sheet 1
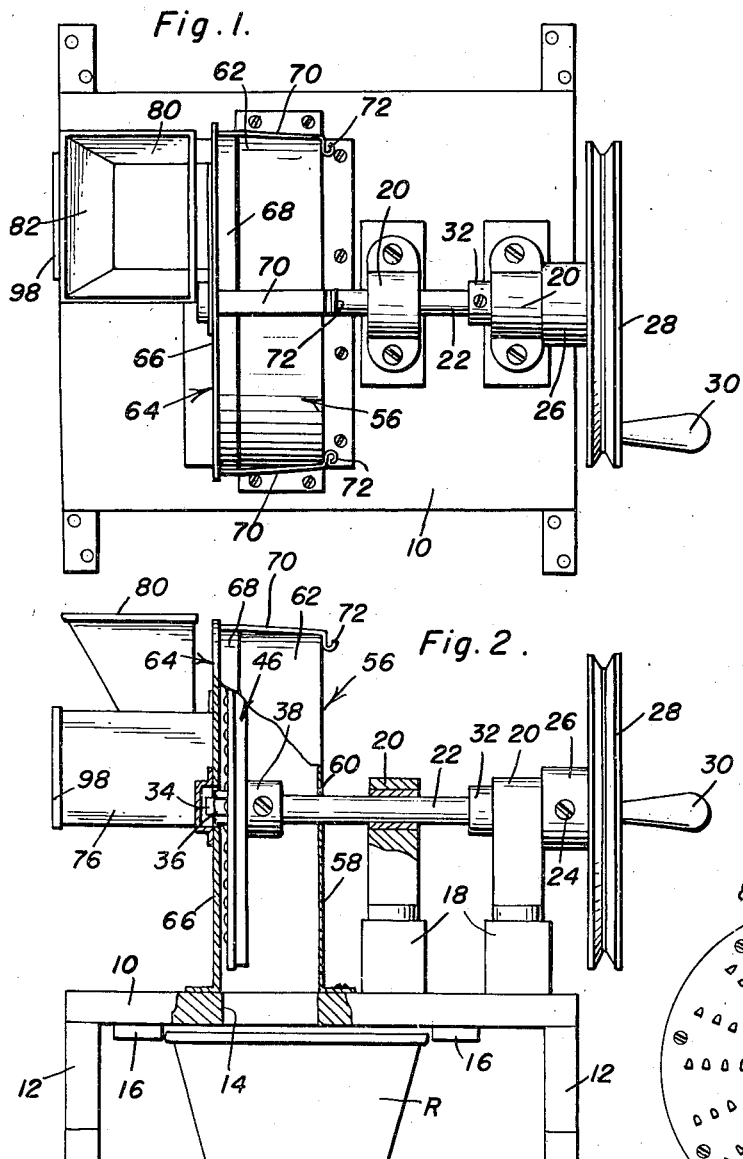
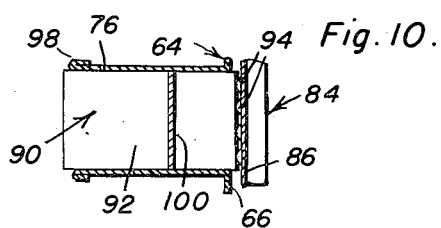
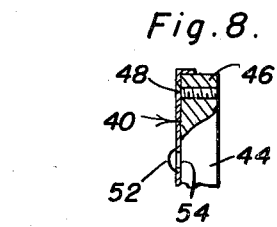
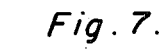
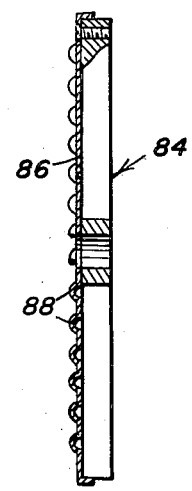
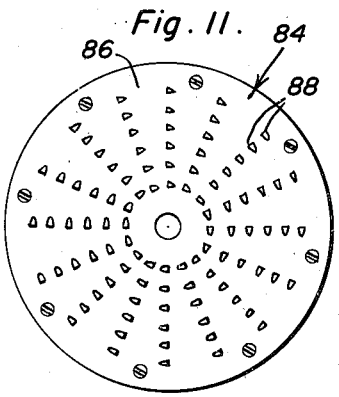
William F. Murray
INVENTOR.

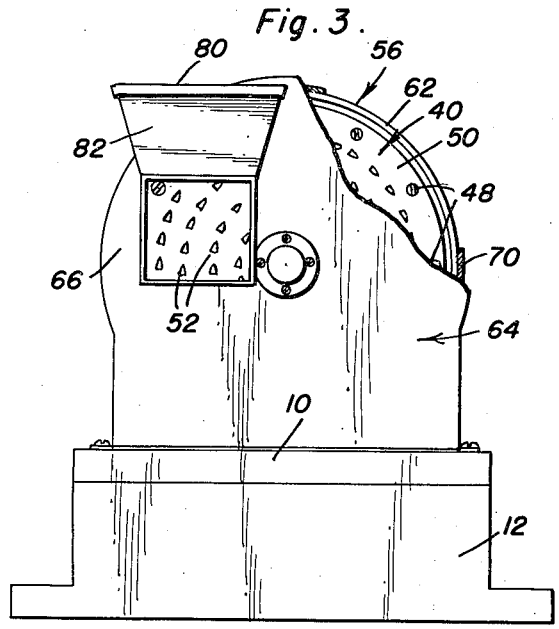
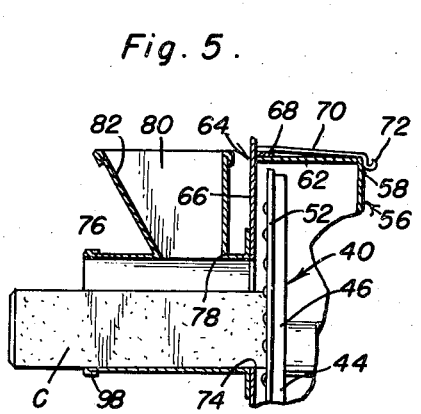
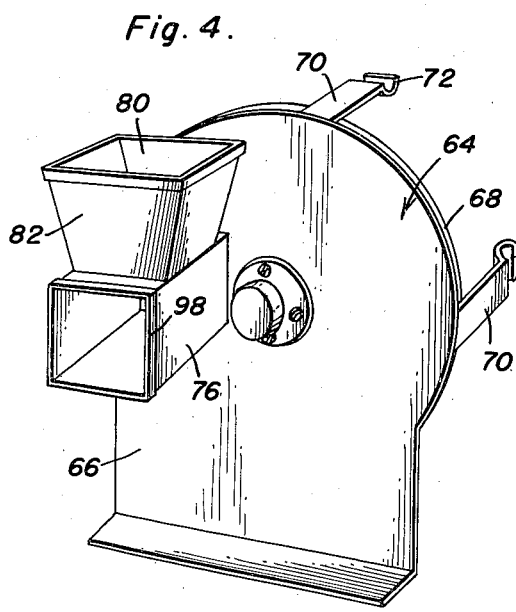
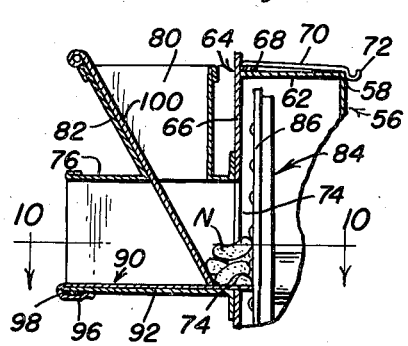
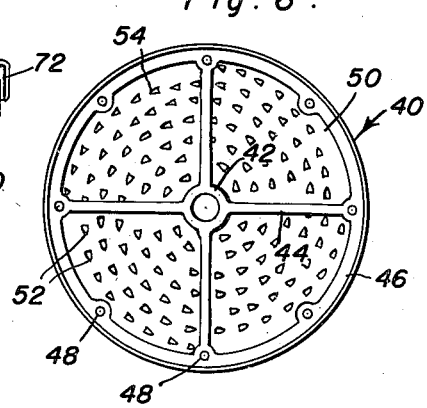
William F. Murray
INVENTOR.

Patented July 26, 1949

2,477,198

UNITED STATES PATENT OFFICE 2,477,198

GRATER OR SHREDDER

William F. Murray, Washington, D. C.

Application December 15, 1947, Serial No. 791,855

2 Claims. (Cl. 146—177)

This invention relates to apparatus which may be used for the purpose of grating or shredding.

The primary object of the invention is to facilitate the grating of foodstuffs, such as chocolate, nuts or the like preparatory to using the grated substance as a coating for candy or the like.

The above and other objects may be attained by employing this invention which embodies among its features a hollow cylindrical casing having an open end, a drive shaft extending axially through the opposite end of the casing and terminating within the casing adjacent its open end, an abrading wheel detachably mounted on the shaft adjacent the open end of the casing, a cover detachably secured to the casing for closing the open end thereof and said cover having a feed opening which is axially offset relative to the drive shaft.

Other features include a feed tube carried by the cover, aligning axially with the feed opening in the cover, the bottom walls of the feed opening and of the feed tube lying in the same horizontal plane which lies substantially tangent to the bottom of the drive shaft, peripherally spaced spring arms carried by the cover and extending longitudinally over the outside of the casing, hooks at the ends of the spring arms adapted to engage the end of the casing remote from the open end thereof for holding the cover in end closing position on the casing, a hopper opening into the feed tube, a false bottom detachably fitted in the feed tube and projecting into the casing to prevent material being grated from falling into the space between the grating wheel and the cover and a guide plate removably entered into the hopper and engaging the false bottom to direct the material to be grated toward the grating wheel.

In the drawings,

Figure 1 is a top plan view of a grater or shredder, embodying the features of this invention.

Figure 2 is a side view of the apparatus illustrated in Figure 1, certain portions thereof being shown in section more clearly to illustrate certain details of construction.

Figure 3 is a front end view of the device illustrated in Figures 1 and 2.

Figure 4 is a perspective view of the cover plate.

Figure 5 is a fragmentary longitudinal sectional view through the feed tube and a portion of the cover plate.

Figure 6 is a face view of an abrading wheel such as is employed for the purpose of grating bar material, such as chocolate or the like.

Figure 7 is an enlarged sectional view through the grating wheel illustrated in Figure 6.

Figure 8 is a fragmentary enlarged sectional view through a portion of the grating wheel.

Figure 9 is a view similar to Figure 5, illustrating the false bottom and the guide plate in place in the feed tube.

Figure 10 is a horizontal sectional view taken substantially along the line 10—10 of Figure 9, and Figure 11 is a face view of an abrading wheel such as is used for grating chunk material, such as nuts or the like.

Referring to the drawings in detail, a base 10 is supported in spaced relation to a table, counter or the like on suitable legs 12, and formed intermediate the ends of the table is an elongated slot or discharge opening 14 which extends transversely, and through which the grated material is discharged into a suitable receptacle R. Suitable guide strips 16 are attached in spaced parallel relation to the underside of the base 10 and serve to locate the receptacle R in proper position beneath the discharge opening 14 previously referred to. Extending vertically from the upper side of the base 10 to one side of the discharge opening 14 are spaced parallel pedestals 18 carrying at their upper ends journal bearings 20 in which a drive shaft 22 is mounted to rotate about a horizontal axis which lies parallel to the base 10. Secured as by a set-screw 24 to the shaft adjacent the end remote from the opening 14 is the hub 26 of a drive pulley 28 which may be equipped with a handle 30 by means of which the pulley and shaft may be rotated. As illustrated, the hub 26 engages the outer face of the journal bearing 20 furthest removed from the slot 14 in the base 10, and secured to the shaft against the inner face of said journal bearing is a stop collar 32 which cooperates with the hub 26 in holding the shaft against endwise movement. The end of the shaft 22 remote from the drive pulley 28 is externally screw-threaded as at 34 for cooperation with a clamp nut 36 the purpose of which will be more fully hereinafter explained.

Fixed to the shaft 22 adjacent the threaded end 34 in the stop collar 38 which is adapted to cooperate with the clamp nut 36 in holding an abrading wheel in proper position on the shaft.

For grating chocolate or similar solids, an abrading wheel such as that designated generally 40 (Figure 6) is employed. This wheel comprises a hub portion 42 from which radiate spokes 44 supporting at their outer ends a rim 46. Attached to the rim 46 by screws 48 is an abrading plate 50 which is provided with a spiral row of cutting teeth 52 which are inclined relative to the plate and adapted to direct the grated material through holes 54 which extend through the plate. When grating solid material such as chocolate or the like, the spiral formation of the teeth assures the cutting of the entire surface of the block of chocolate or the like which is presented to the wheel.

Fixed to the base 10 is a substantially cylindrical casing designated generally 56 which comprises an end wall 58 of substantially circular formation having an axial opening 60 therein which aligns with the axes of the bearings 20. Formed peripherally of the end plate 58 is an annular flange 62 which as illustrated in Figure 2, encircles the abrading wheel 46 and opens downwardly in line with the opening 14 in the base 10 in order that the grated substance will be directed to said opening.

Detachably closing the open end of the casing 56 is a cover designated generally 64 comprising a plate 66 of substantially the same contour as the plate 58, and extending about the perimeter of the plate 66 is a flange 68 which is adapted to overlie the flange 62 in order to effect a tight juncture between the cover and the casing. Spring arms 70 are carried by the flange 68 at spaced points and project outwardly therefrom substantially parallel with the axis of the shaft 22 so as to overlie the flange 70 as will be readily understood upon reference to the drawings. Inturned fingers 72 are formed at the ends of the spring arms 70, remote from the flange 68 and are adapted when the cover is in place to engage the wall 58 of the casing 56 in order removably to support the cover plate 64 in place thereon. Formed in the cover plate 64 and offset axially with relation to the shaft 22 is a rectangular opening 74, the bottom edge of which lies in a plane substantially tangential to the bottom of the shaft 22, and fixed to the plate 66 and extending outwardly therefrom, i. e., in a direction opposite the flange 68 is a rectangular tube 76 the inner surfaces of which lie in planes with the walls of the opening 74. It will thus be seen that when a bar of material C such as chocolate or the like, is thrust through the feed tube 76 and the feed opening 74, it will contact the abrading wheel 40, so that as the latter is rotated the surface of the bar will be abraded and the material ground therefrom will fall through the casing 56 and opening 14 into the receptacle R. In order that the device may be used for grating divided substances such as nut meats, the top wall of the tube 76 is provided near the end which opens into the opening 74 with a feed opening 78 which is surrounded by an upstanding hopper 80, the wall of which remote from the cover 64 is inclined as at 82 for a purpose to be more fully hereinafter explained.

In order to grate nut meats or the like, I employ a grater wheel designated generally 84 which like the wheel 40 is provided with a hub, spokes and a rim, but in place of the plate 50, the wheel 84 has attached to the hub, spokes and rim a circular plate 86 having annular rows of cutting teeth 88, each of which conforms to the shape of the teeth 52 previously described.

For supporting the nut meats or the like N (Fig. 9) during the grating thereof I provide a false bottom designated generally 90 which as illustrated in Figures 9 and 10, is fitted into the feed tube 76 to rest on the bottom thereof. The false bottom 90 comprises a rectangular plate 92 having formed along one end edge a plurality of spaced notches 94 which as illustrated in Figure 10, are arranged to align with the annular rows of teeth 88 so that the portions of the edge of the plate 92 between the teeth will engage the plate 86 of the wheel 84 and prevent chunks of the nuts being grated from falling downwardly between the cover plate 64 and the wheel 84. The end of the plate 92 remote from the end having the notches 94 therein is bent back upon itself as at 96 to form a spring tongue which engages the folded over end portion 98 of the feed tube 76 in order to form a clip by which the false bottom 90 is retained in place. A guide plate 100 is introduced into the hopper 80 to bear against the wall 82, and forms a substantial continuation thereof so that nuts N deposited in the hopper will be directed toward the abrading wheel 84 as suggested in Figure 9.

In use, when it is desired to grate bar material such as chocolate or the like, the nut 36 is loosened from the shaft 22 and the abrading wheel 40 is placed in position on the shaft, and clamped thereon between the nut 36 and the collar 38. The cover plate 64 is then placed in position with the spring arms overlying the flange 62 of the casing 56, and the fingers 72 engaging the wall 58 of said casing. The bar material C is then fed through the feed tube 76 as suggested in Figure 5, and upon rotation of the drive wheel 28, it will be evident that the teeth 52 will grind away the end of the bar material C. When it is desired to grate nutmeats or the like, the cover plate 64 is removed and the nut 36 unscrewed from the end of the shaft 22 so that the abrading wheel 40 may be removed, and the abrading wheel 84 substituted therefor. The abrading wheel 84 is clamped in place as previously described, and the false bottom 90 is slipped into place against the bottom of the feed tube 76 so that the notched end thereof engages the face of the abrading wheels 84. The guide plate 100 is then dropped into position through the upper open end of the hopper 80 to rest against the wall 82 so that its lower end resting on the false bottom 90 will be positioned in close proximity to the feed opening 74 and when nutmeats or the like are introduced into the hopper 80 they will be directed by the inclined guide plate 100 into contact with the abrading wheel 84 and upon rotation of the drive wheel 28, the nutmeats will be ground or grated into small particles. Owing to the fact that the edge portions of the false bottom 90 between the notches 94 lie extremely close to the abrading face of the plate 86, it will be evident that chunks of nutmeats will be prevented from falling through the device before having been ground to the desired size.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. A grater and shredder comprising a casing having an open end, a drive shaft axially disposed through the opposite end of the casing, an abrading wheel detachably mounted on the shaft and rotatably disposed within the casing, said wheel being formed on its face adjacent the open end with radially disposed rows of teeth, a cover detachably secured to the open end of the casing, said cover being formed with a feed opening, a feed tube secured in alignment with said opening, and a plate slidably disposed on the bottom of the feed tube for longitudinal adjustment therein relative to the abrading wheel, said plate being formed at its inner end with spaced notches, whereby the notches will receive the teeth of the wheel as the wheel rotates and cause all of the material to be grated.

2. A grater and shredder comprising a casing having an open end, an abrading wheel rotatably disposed within the casing and having a series of radial rows of teeth formed on its front face adjacent the open end, a cover detachably secured to the open end of the casing and formed with an opening, a tube secured at one end to the casing in alignment with the opening, a hopper formed on the top of the tube and communicated therewith, a plate slidably disposed in the bottom of the tube for longitudinal adjustment therein relative to the front face of the abrading wheel, said plate being formed at its inner end with spaced projecting teeth adapted to engage against the front face of the abrading wheel with the teeth on the front face of the abrading wheel moving between the teeth on the plate, and a baffle member diagonally disposed in a substantial vertical plane in the hopper and having its lower edge disposed adjacent the inner toothed edge of the plate whereby material placed in the hopper is directed onto the inner edge of the plate.

WILLIAM F. MURRAY.

REFERENCES CITED

The following references are of record in the file of this patent:

UNITED STATES PATENTS

| Number | Name | Date |
|--------|------|------|
| 188,059 | Kelly | Mar. 6, 1877 |
| 666,211 | Shortt | Jan. 15, 1901 |
| 677,473 | Royal | July 2, 1901 |
| 1,423,960 | Mohnacs | July 25, 1922 |
| 1,866,630 | Donahoo | July 12, 1932 |
| 2,411,333 | Orland | Nov. 19, 1946 |
| 2,417,564 | Newman | Mar. 18, 1947 |